United States Patent [19]

Belore et al.

[11] 4,261,717
[45] Apr. 14, 1981

[54] AIR CLEANER WITH FUEL VAPOR DOOR IN INLET TUBE

[75] Inventors: Kevin L. Belore; Tiong H. Kho, both of Chatham, Canada

[73] Assignee: Canadian Fram Limited, Chatham, Canada

[21] Appl. No.: 85,156

[22] Filed: Oct. 15, 1979

[51] Int. Cl.³ .................... B01D 51/00; F22B 7/00
[52] U.S. Cl. ...................... 55/419; 55/316; 55/510; 123/518; 123/588
[58] Field of Search ............... 55/316, 487, 387, 419, 55/510; 123/136, 119 D, 119 R, 179 G, 179 R, 518, 588; 261/72 R, DIG. 67; 137/527; 251/82, 303

[56] References Cited

U.S. PATENT DOCUMENTS

| | | | |
|---|---|---|---|
| 2,767,735 | 10/1956 | Darling | 137/527 |
| 3,016,914 | 1/1962 | Keithahn | 137/454.2 |
| 3,505,794 | 4/1970 | Nutter et al. | 55/498 |
| 3,513,643 | 5/1970 | Tarala | 55/473 |
| 3,513,817 | 5/1970 | Kearsley | 55/419 |
| 3,540,423 | 11/1970 | Tolles | 55/510 |
| 3,574,988 | 4/1971 | Buckman | 55/510 |
| 3,590,862 | 7/1971 | DeGraaf | 251/303 |
| 3,678,912 | 7/1972 | Hensler | 55/419 |
| 3,727,597 | 4/1973 | Hensler | 55/387 |
| 4,157,366 | 6/1979 | Ruth et al. | 261/DIG. 67 |
| 4,181,513 | 1/1980 | Fukada et al. | 55/316 |

FOREIGN PATENT DOCUMENTS 2006635  5/1979  United Kingdom ............. 55/419

*Primary Examiner*—Bernard Nozick
*Attorney, Agent, or Firm*—Ken C. Decker; William N. Antonis

[57] ABSTRACT

An air filter for filtering combustion air for an internal combustion engine includes a housing holding a filter element and an inlet snorkel tube connected to the housing. A "trap door" valve mechanism is located in the snorkel tube and includes a valve seat mounted on a support which circumscribes the inner wall of the snorkel tube and a valve element pivotally mounted on the support which is yieldably urged into sealing engagement with the valve seat when the engine is turned off. The valve mechanism presents a surface substantially transverse to the direction of air flow through the snorkel tube, so that combustion air communicated through the snorkel tube when the engine is running acts against the transverse surface urging the valve element to an opened position. The valve element is "cracked open" by a solenoid when the engine is to be started in order to permit initial air flow through the air cleaner to facilitate starting. Accordingly, when the vehicle engine is turned off, the valve element closes, thereby preventing the escape of gasoline vapors to the ambient atmosphere. The filter element inside the air cleaner housing includes a charcoal impregnated pleated paper element in series with the conventional pleated paper filter element. The charcoal impregnated element adsorbs the vapors trapped in the housing by closure of the valve mechanism when the engine is turned off. The charcoal impregnated paper is purged by the normal air flow through the air cleaner when the engine is started again.

6 Claims, 4 Drawing Figures

AIR CLEANER WITH FUEL VAPOR DOOR IN INLET TUBE

BACKGROUND OF THE INVENTION

This invention relates to an automotive air cleaner for an internal combustion engine and a filter element therefor.

Significant advances have been made in recent years in controlling the emission of hydrocarbon pollutants from vehicle engines. As a result, a significant proportion of the remaining hydrocarbon emissions from a vehicle engine occur after the vehicle engine has been turned off. While the engine cools down after the ignition has been turned off, some of the fuel remaining in the carburetor boils out through the vehicle air cleaner. In order to reduce the hydrocarbon emissions to the absolute minimum, it is desirable to provide a vehicle air cleaner and filter cartridge therefor which traps the fuel vapors in the air cleaner and prevents their escape into the atmosphere when the vehicle engine is turned off. Of course, it is also necessary that this emission control arrangment not interfere with the normal running operation of the engine. The present invention solves these problems by providing a "trap door" valve mechanism in the inlet snorkel tube connected to the air cleaner. When the vehicle engine is turned off, the trap door valve element is urged into sealing engagement with the valve seat in the snorkel tube, thereby preventing communication of fuel vapors through the snorkel tube into the atmosphere. An improved filter element, which includes a charcoal impregnated pleated paper element in addition to the normal pleated paper filtering element, adsorbs fuel vapors trapped in the air cleaner. When the vehicle engine is to be started, an actuator opens the trap door valve element an incremental amount sufficient to permit sufficient combustion air to enter the engine to allow the engine to start. When the engine starts, air communicating through the snorkel tube reacts against the transverse surface of the trap door valve element, thereby forcing it to assume a new position dependent on the pressure differential formed across the valve element. Accordingly, whenever the engine is operating, the valve element in the snorkel tube is automatically held in an opened position by communication of combustion air through the snorkel tube. Prior art devices general required complicated electrical or vacuum operated actuators to ensure that the valve element remained in an open position. The prior art also provides a charcoal ring which was used in series with the conventional pleated paper filter element, but this charcoal ring was commonly placed downstream of the conventional filter element, which permitted carbon particles to break off from the ring and enter the engine. Furthermore, these rings were not a part of the air cleaner element, so that the vehicle owner was not forced to change the carbon ring at regular intervals, as is necessary to ensure proper vapor adsorption.

Therefore, one advantageous effect of our invention is that the inlet snorkel tube of an engine air cleaner is sealed against the escape of hydrocarbon vapors when the engine is shut off, but is automatically open upon starting of the engine to permit combustion air to reach the carburetor.

Another advantageous effect of our invention is to provide an air cleaner with an improved air filter element which includes an integral vapor adsorbent material which is pleated with the pleated paper element and which is changed when the filter element is changed, and in which charcoal from the vapor adsorbent element is prevented from reaching the engine.

DESCRIPTION OF THE DRAWINGS

FIG. 4 is a fragmentary cross-sectional view taken substantially along lines 4—4 of FIG. 1.

DETAILED DESCRIPTION

Figure 1:
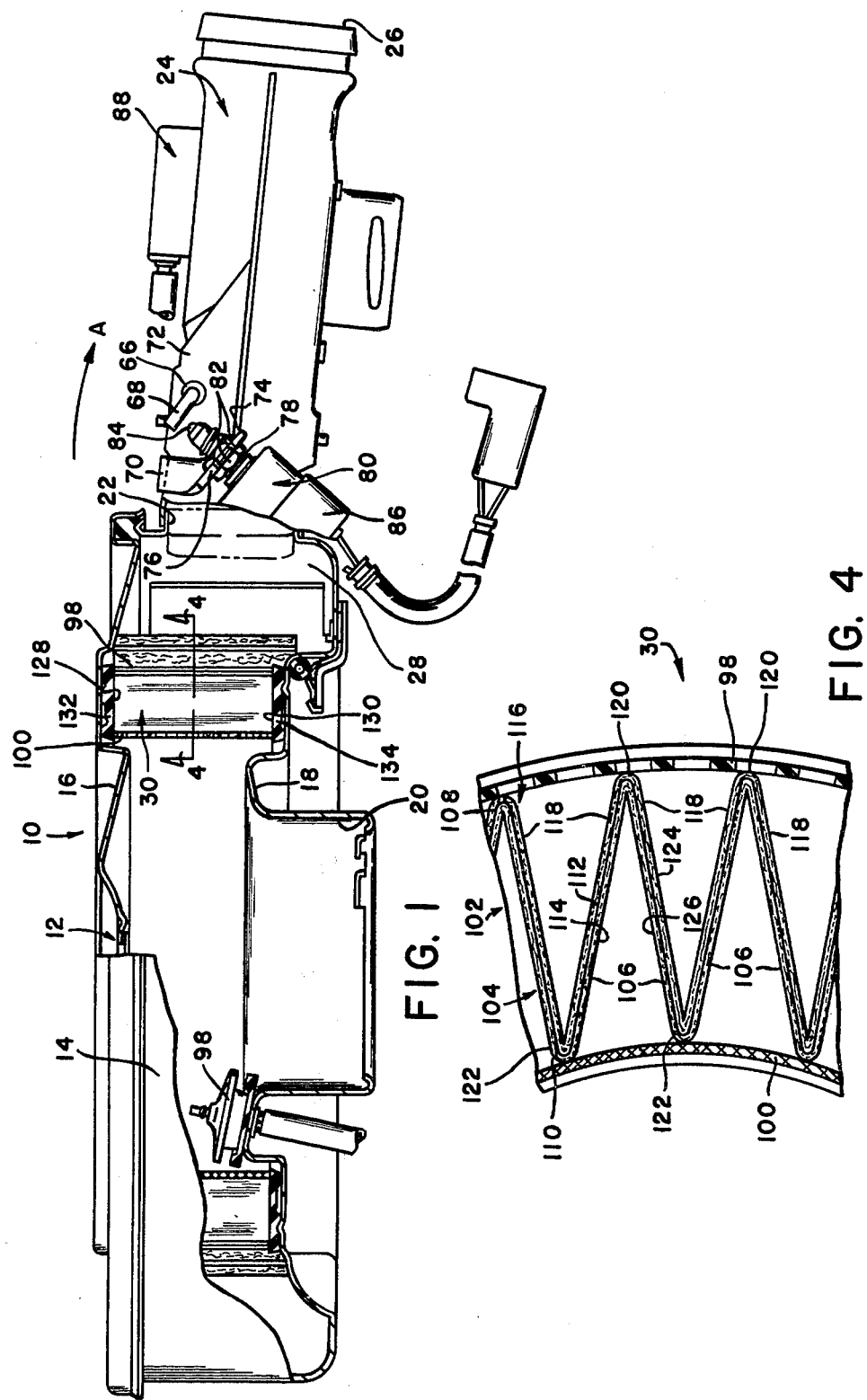
FIG. 1 is a side elevational view, partly in section, illustrating an air cleaner made pursuant to the teachings of our present invention.

Referring now to the drawings, an engine air cleaner generally indicated by the numeral 10 includes a cylindrical housing generally indicated by the numeral 12 having a circumferentially extending outer wall 14, an upper cover or closure member 16, and a lower wall 18 which defines an opening 20 therein which communicates with the engine fuel supply system when the air cleaner 10 is installed on the engine. An inlet opening 22 is defined in the cylindrical wall 14 and communicates with an inlet snorkel tube generally indicated by the numeral 24. The opened end 26 of the snorkel tube 24 is open to a combustion air supply and is adapted to communicate combustion air through the snorkel tube 24 and the inlet 22 into the chamber 28 defined within the air cleaner housing 12. A replaceable air filter element generally indicated by the numeral 30 is disposed in the chamber 28 and will be discussed in detail hereinbelow. The filter element 30 extends all the way across the chamber 28 so that all of the combustion air communicated through the snorkel tube 24 must pass through the filter element 30 before passing through the outlet 20 and into the vehicle fuel supply system.

Figure 2:
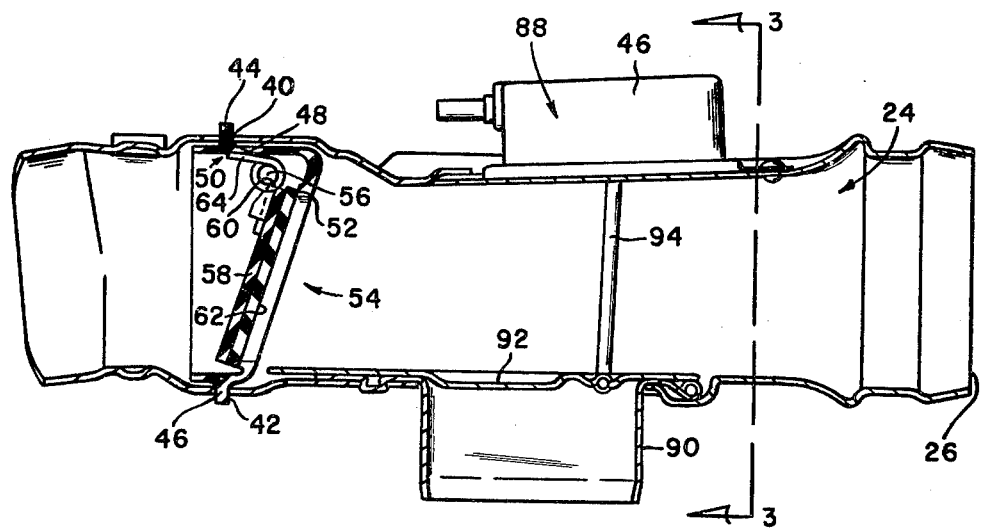
FIG. 2 is a longitudinal cross-sectional view of the inlet snorkel tube used in the air cleaner of FIG. 1.
Figure 3:
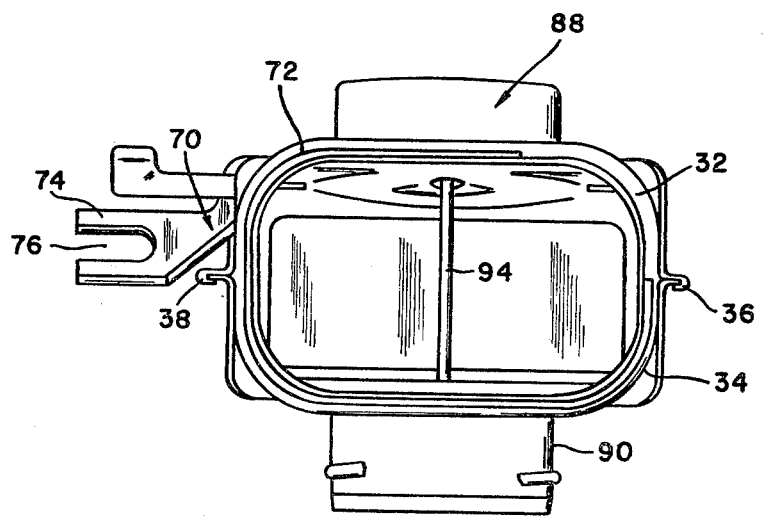
FIG. 3 is a transverse cross-sectional view taken substantially along lines 3—3 of FIG. 2 but with the solenoid actuator removed.

Referring now to FIGS. 2 and 3 of the drawings, the snorkel tube 24 is manufactured from an upper and lower shells 32, 34 which are clinched together at axially extending seams 36, 38 on opposite sides of the snorkel tube 24. The upper and lower shells 32, 34 are provided with transversely extending slots 40, 42 respectively. The slots 40, 42 are adapted to receive corresponding tabs 44, 46 which project from the outer surface 48 of a support or mount 50 which circumscribes the inner wall of the snorkel tube 24 and carries a valve seat 52. The valve seat 52 defines an opening 54 through which air communicates through the snorkel tube. The support 50 carries a pivot pin 56 which carries a valve member 58 secured to the pivot pin 56 along its upper edge 60. The valve member carries a resilient material 62 which is adapted to sealingly engage the valve seat 52 and thereby prevent communication through the snorkel tube 26. A spring 64 yieldably urges the valve member 58 into the position at which it sealingly engages the valve seat 52. However, it will be noted that the valve member 58 presents a transverse area against which air flow forced through the snorkel tube 24 reacts. Accordingly, air flow through the snorkel tube during normal vehicle operating conditions is able to force the valve member 58 away from the valve seat 52 into an opened position. The pivot pin 56 is rigid with the valve member 58, so that rotation of the pivot pin 56 also moves the valve member 58.

One end of the pivot pin 56 pierces the wall of the snorkel tube 24 as at 66 and terminates in a lever 68 which extends at substantially a right angle to the axis of the pivot pin 56. A bracket 70 is welded or otherwise secured to the upper surface 72 of the snorkel tube 24. The bracket presents a bifurcated portion 74 which defines a slot 76. The slot 76 receives a threaded portion 78 of a solenoid housing 80. Nuts 82 on threaded portion 78 of the housing 80 adjustably position the housing 80 on the bracket 70. A plunger 84 is slidably mounted within the housing 80 and is adapted to engage the lever 68 and rotate the latter an incremental distance in the direction indicated by the arrow A. The plunger 84 is actuated by a solenoid (not shown) inside portion 86 of the housing 80. The solenoid in portion 86 of housing 80 is energized when the vehicle ignition is turned on.

The snorkel tube 24 is also provided with a thermally modulated control system generally indicated by the numeral 88. Although ambient air is normally communicated through the inlet 26 of the snorkel tube 24, under certain vehicle operating conditions, such as cold start, it is desirable to communicate warmed air to the engine. Warmed air is communicated through inlet tube 90 from a suitable source. A connecting pin 94 permits operation of the valve member 92 by a vacuum motor in housing 96. The vacuum motor is controlled by thermal sensor 98 inside the chamber 28 of air cleaner 10. The thermally modulated air control system 88 is more completely described in U.S. Pat. No. 3,513,817 owned by the parent company controlling the assignee of the present invention.

Referring now to FIGS. 1 and 4, the filter element 30 includes a circumferentially extending outer screen 98 and a circumferentially extending inner screen 100. The screens 98 and 100 are substantially concentric with the outlet opening 20 and cooperate with one another to define a compartment 102 therebetween. A pleated paper filtering medium 104 is located in the compartment 102. Filtering medium 104 consists of a circumferentialy extending array of radially tapering pleats 106. Pleats 106 extend from radial outer tips 108 to radial inner tips 110 and define an outer surface 112 and an inner surface 114. A charcoal impregnated vapor adsorbent paper 116 also consists of a circumferentially extending array of radially tapering pleats 118. The pleats 118 extend from radial outer tips 120 to inner tips 122 and define an outer surface 124 and an inner surface 126 which lays against the outer surface 112 of the pleats of the pleated paper element 104. The upper and lower edges 128, 130 of the pleats 106, 118, and the upper and lower edges of the screens are imbedded in plastisol end caps 132, 134 so that a sealing engagement may be effected between the filter element and the air cleaner housing.

MODE OF OPERATION

The various components of the air cleaner are illustrated in the drawings in the positions which they assume when the vehicle engine is turned off. When the vehicle ignition switch is turned on, the solenoid (not shown) within the housing 86 is energized, forcing the plunger 84 outwardly from the housing 80. The plunger 84 engages the lever 68 and rotates the latter an incremental distance substantially less than the distance required to rotate the valve element 58 into the fully opened position. This incremental opening of the valve element 58 permits sufficient combustion air to be communicated through the snorkel tube 24 to permit the vehicle engine to start. After the vehicle engine is started, the substantially greater air flow through the air cleaner 10 due to the suction created in the engine induction manifold causes the air flow through the snorkel tube 24 to increase greatly. Since, even in its incrementally open position, the valve element 58 presents a substantial surface area which is transverse to the direction of flow through the snorkel tube 24, the force of the air communicated through the snorkel tube forces the valve element 58 upwardly viewing the drawing, against the bias of the spring 64 and into a more opened position. Accordingly, the size of the solenoid can be quite small, since it need only "crack open" the valve element 58 during engine starting.

When the engine is turned off, the spring 64 returns the valve element 58 to the position illustrated in FIG. 2 wherein the valve element 58 sealingly engages the valve seat 52. Accordingly, fuel vapors boiling out of the carburetor and entering the air cleaner through the outlet passage 20 are prevented from escaping through the snorkel tube 24 to the atmosphere. These fuel vapors are adsorbed by the charcoal impregnated paper 116, thereby preventing fuel vapors from escaping into the atmosphere. When the vehicle engine is restarted, of course, the valve element 58 is reopened in the manner described above, and the air flow communicated through the snorkel tube 24 passes through the charcoal impregnated paper element 116, thus purging the latter of the fuel vapors which had been adsorbed thereby when the engine was shut off. It will be noted that the charcoal impregnated paper 116 is located upstream of the pleated paper filter element 104, so that any charcoal particles that may be dislodged during normal engine operation are prevented from entering the engine by the pleated paper filter element 104. It will also be noted that the charcoal impregnated paper 116 can be pleated at the same time that the paper comprising the element 104 is pleated, thereby facilitating manufacture of the filter element 30. Finally, the charcoal impregnated paper element 116 and the pleated paper filter element 104 are enclosed within common plastisol end caps and inner and outer screens, so that when the air filter element is replaced, the charcoal impregnated paper is also replaced at the same time. Occasional replacement of the charcoal impregnated paper is necessary, because even though the paper is purged every time the vehicle engine is started, some fuel vapor residue will remain, which will gradually render the adsorbent qualities of the element 116 ineffective.

We claim:

1. In an air cleaner for an internal combustion engine having an induction passage, said air cleaner including a housing having an inlet, said housing further including an outlet communicated with said induction passage, a snorkel tube connected to said inlet for communicating air into said housing through said inlet, a filtering medium in said housing between the inlet and outlet and arranged so that all of the air flow communicated to said outlet passes through the filtering medium, wherein the improvement comprises a valve seat in said snorkel tube circumscribing the inner wall of the latter, a mount for said valve seat, said mount including tabs projecting from said mount, the wall of said snorkel tube having slots receiving said tabs to thereby retain said valve seat in a predetermined position within said snorkel tube, a valve member for sealing engagement with said valve seat, a pivot pin carried by said mount for pivotally connecting the valve member to the latter to thereby permit the valve member to pivot relative to the snorkel tube toward and away from a position in which the valve member sealingly engages the valve seat, and a spring yieldably urging said valve member into sealing engagement with said valve seat, whereby the force of air passing through the snorkel tube when the engine is operating forces the valve member against the bias of said spring into an opened position.

2. The invention of claim 1, wherein:
said snorkel tube is split longitudinally to define a pair of mating sections, each of said sections having one of said slots for receiving a corresponding tab, said mount being an annular member installed in said snorkel tube before the mating sections are fastened together.

3. The invention of claim 1, wherein:
a thermally modulated control mechanism is carried by said snorkel tube, said thermally modulated control mechanism communicating said snorkel tube with either of two sources of air depending upon the air temperature at the engine, said valve member and valve seat being located in said snorkel tube between said thermally modulated control mechanism and said inlet.

4. In an air cleaner for an internal combustion engine having an induction passage, said air cleaner including a housing having an outlet communicated with said induction passage and an inlet, a snorkel tube connected to said inlet for communicating air into said housing through said inlet, a filtering medium to said housing between said inlet and outlet and arranged so that all of the air flow communicated to said outlet passes through the filtering medium, wherein the improvement comprises a valve seat in said snorkel tube circumscribing the inner wall of the latter, a valve member for sealing engagement with said valve seat, a pivot connection between said valve member and said snorkel tube, a spring yieldably urging said valve member into sealing engagement with said valve seat, but permitting said valve member to move away from said valve seat in response to air flow through said snorkel tube toward said inlet, whereby the force of air passing through the snorkel tube into said housing when the engine is operating forces said valve member away from said valve seat and into an opened position, said spring yieldably maintaining said valve member in sealing engagement with said valve seat when the engine is shut off and air flow through said snorkel tube ceases, and electrically operated means actuable when the engine is started for moving said valve member an incremental distance away from sealing engagement with said valve seat to initiate air flow to said engine, said incremental distance being substantially less than the distance required to move said valve member to its fully opened position, said air cleaner including a mount for said valve seat, said mount including tabs projecting from said mount, the wall of said snorkel tube having slots receiving said tabs to thereby retain said valve seat in a predetermined position within said snorkel tube.

5. The invention of claim 4, wherein:
said snorkel tube is split longitudinally to define a pair of mating sections, each of said sections having one of said slots for receiving a corresponding tab, said mount being an annular member installed in said snorkel tube before the mating sections are fastened together.

6. The invention of claim 4:
and a pivot pin providing a pivot connection between one edge of said valve member and said mount so that said valve member is suspended from said pivot pin to present a surface substantially transverse to the direction of air flow through said snorkel tube when the valve member is in sealing engagement with said valve seat.

* * * * *